United States Patent [19]
Conrow et al.

[11] 3,978,971
[45] Sept. 7, 1976

[54] BULB ACCUMULATOR

[75] Inventors: Jonathan M. Conrow, Cleveland Heights; Myron Radzykewycz; Darrell W. Markijohn, both of Lakewood, all of Ohio

[73] Assignee: General Electric Company, Schenectady, N.Y.

[22] Filed: June 6, 1975

[21] Appl. No.: 584,390

[52] U.S. Cl............................... 198/462; 198/394; 198/400; 198/604; 198/626; 198/836
[51] Int. Cl.²......................................... B65G 47/29
[58] Field of Search .............. 198/28, 34, 165, 252, 198/253, 281, 282, 287

[56] References Cited
UNITED STATES PATENTS

| 1,888,851 | 11/1932 | Donovan et al. ............... 198/287 X |
|---|---|---|
| 2,439,883 | 4/1948 | Brown et al. ..................... 198/34 X |
| 2,672,341 | 3/1954 | Flint................................. 198/28 X |
| 2,769,523 | 11/1956 | Ochwat.............................. 198/34 |
| 3,124,231 | 3/1964 | Ott, Jr............................. 198/165 X |
| 3,179,237 | 4/1965 | Ninneman.......................... 198/165 |
| 3,367,015 | 2/1968 | Brosene, Jr. ..................... 198/287 X |
| 3,517,797 | 6/1970 | Daleffe et al. .................. 198/287 X |
| 3,655,027 | 4/1972 | Douglas et al. .................. 198/287 X |

*Primary Examiner*—Evon C. Blunk
*Assistant Examiner*—Richard K. Thomson
*Attorney, Agent, or Firm*—Paul F. Wille; Lawrence R. Kempton; Frank L. Neuhauser

[57] ABSTRACT

A bulb accumulator for electric lamp bulbs is disclosed wherein the bulbs are supported, in transit, by moving belts and a fixed member or, when accumulated, by the fixed member and the bulb ahead.

8 Claims, 3 Drawing Figures

BULB ACCUMULATOR

BACKGROUND OF THE INVENTION

This invention relates to the manufacture of electric lamps and, in particular, to an accumulator for temporarily storing either bulbs or finished lamps prior to the next manufacturing operation.

In any manufacturing operation, it is desired that the machine performing the manufacturing steps have an adequate supply of parts at hand in order to achieve maximum utilization of the machine. In the specific case of the manufacture of electric lamps, an automatic lamp manufacturing machine group requires that an adequate supply of bulbs be available to the sealing turret, where the bulb and mount are joined and sealed.

Present supply systems are encumbered by jams and breakdowns causing gaps in the bulb supply. Present linear or in-line accumulators convey the bulbs hanging cullet-down between two parallel belts. The bulbs accumulate by simply being forced against one another at the outfeed end of the accumulator. This is hard on the bulbs since they are forced together by the belts, causing jams and breakage, and limits these devices to fewer bulbs than desired.

For larger capacity, circular accumulators are added in which the bulbs are held between a spiral track and a rotating drum. This causes additional breakage due to the rotation of the bulbs. Where the bulbs accumulate, the touching surfaces on adjacent bulbs are moving in opposite directions, causing possible scoring, and a consequent weakening, of the bulb. This may result in immediate breakage or, worse, breakage in the sealing turret due to thermal stress. Additional breakage may be caused by the higher bulb-to-bulb pressure. Since broken glass falls down on good bulbs from the tiers above, damage to good bulbs may result as well as jam-ups. This type of accumulator rotates relatively slowly and has a relatively large recovery time, i.e., the time it takes for a bulb to travel from the infeed end to the escapement when the accumulator is empty.

Accumulators of the prior art typically employ gate-type escapement mechanism for metering the bulbs on the outfeed end of the accumulator. This type of release jars the bulbs with repeated impacts since the bulbs are forced forward by the conveyor belts, causing further breakage and jamming.

In general, bulb accumulators of the prior art are characterized by high bulb-to-blub contact pressure and abrupt handling of the bulbs.

There is thus a need to be able to temporarily store or accumulate bulbs near the sealing turret and to feed them at a uniform rate even though the bulb supply to the accumulator contains gaps. There is also a need to accumulate the bulbs as gently as possible. It is also desired that the bulb makeup or recovery time be kept to a minimum.

SUMMARY OF THE INVENTION

In view of the foregoing, it is therefore an object of the present invention to provide an in-line bulb accumulator.

It is a further object of the present invention to provide a bulb accumulator characterized by lower bulb-to-bulb pressure than those of the prior art.

It is another object of the present invention to provide a bulb accumulator in which contact with the conveyor belt is eliminated when the bulbs accumulate.

It is a further object of the present invention to provide an accumulator with minimal recovery time when empty.

It is another object of the present invention to provide a bulb accumulator having an escapement mechanism which handles the bulbs more gently and moves the bulbs with continuous motion.

The foregoing objects are achieved in the present invention wherein the spiral or revolving drum type of accumulator is eliminated. Instead, a portion of the flat belt conveyor typically used is removed and a parallel, round belt conveyor is inserted. Unlike prior art round belt conveyors, the in-line acumulator of the present invention is provided with a drag strip positioned below the belts and across which the cullets of the bulbs drag. When the progress of a bulb is stopped or slowed down at the outfeed end, the bulbs stack slightly, lifting off of the conveyor belts, so that the bulb is supported by the cullet resting on the fixed member and by the neck of the bulb in front, with no contact with the conveyor belts. This provides low bulb-to-bulb pressure, reducing jamming or breakage. Recovery time is reduced since the lamps can be conveyed faster than in the prior art and faster than the flat belt supplying bulbs at the infeed end. A continuous escapement is provided by parallel, cleated belts which gently grip the bulbs and move them forward continuously, at a slower rate than that of the conveyor belts.

BRIEF DESCRIPTION OF THE DRAWING

A more complete understanding of the present invention can be obtained by considering the following detailed description in conjunction with the accompanying drawing, in which.

DESCRIPTION OF THE PREFERRED EMBODIMENTS

Figure 1:
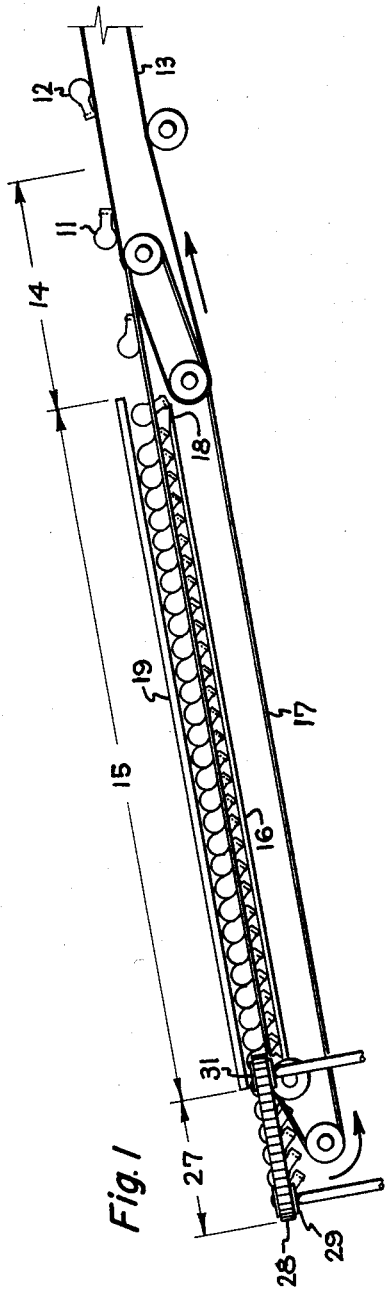
FIG. 1 illustrates a preferred embodiment of the present invention.

Referring to FIG. 1, lamp bulbs such as bulbs 11 and 12 are supplied to the accumulator on a flat belt conveyor 13 which receives the bulbs from a bulk storage facility, not shown. From flat belt conveyor 13, the bulbs enter an infeed section 14 in which the bulbs are transferred in a manner well known to those of skill in the art from flat belt conveyor 13 to a pair of parallel round belts which enable the bulbs to be suspended by the bulbous portion thereof so that the cullet portion is pendent. Infeed section 14 is well known per se to those of skill in the art and typically includes, for example, devices for orienting the randomly positioned bulbs transferring from flat belt conveyor 13 and a device to remove bulbs with no cullet. It is preferred that the round belts be driven faster than the flat belt so that any groups of bulbs on the flat belt are pulled apart upon transfer. Infeed section 14 also removes broken glass from the system since it falls off flat belt conveyor 13 between the parallel round belts.

From infeed section 14, the bulbs pass to accumulator section 15 which comprises a cullet drag strip 16 positioned beneath the support level provided by round conveyor belts 17 so that the cullet of the bulb drags on the strip causing the cullet to be inclined away from the direction of travel. Leading edge 18 of drag strip 16 (as seen by the bulbs) is preferably curved to aid in the transition from pendent to inclining. Other transition aids may be used as well.

Positioned above the support level of the bulbs, at a distance sufficient to enable the bulbs to convey underneath without touching, is hold-down strip 19 which serves to prevent one bulb from climbing too high on the bulb in front of it during accumulation. It also prevents the bulb from becoming misoriented and thus jamming the accumulator.

Figure 2:
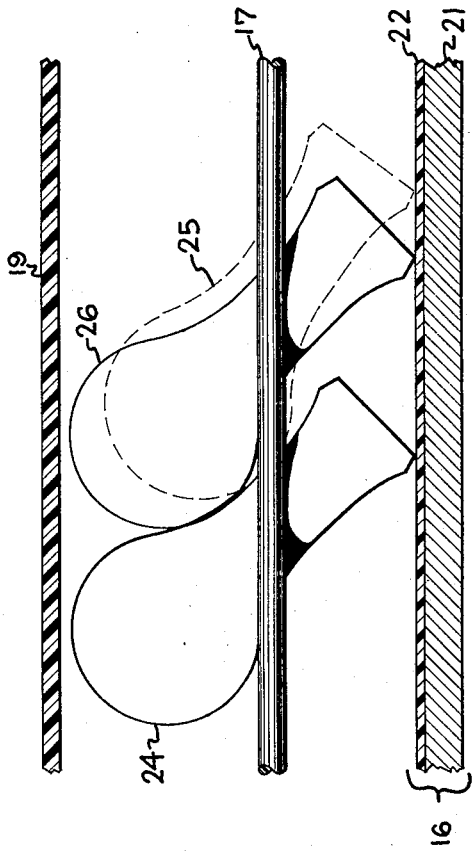
FIG. 2 is a detail of the bulbs accumulating.

The mechanism by which the bulbs are accumulated and stacked slightly to relieve contact with round conveyor belts 17 may be more fully understood by considering FIG. 2 which represents an enlarged portion of accumulation section 15. In FIG. 2, drag strip 16 comprises a metal base 21 having a plastic covering or coating 22. Covering 22 may comprise any suitable material upon which the cullets drag. It is only required that the material exhibit friction against glass, and, for practical reasons, it is also desired that the material be highly resistant to abrasion for long life. By way of example only, polyurethane has been found to fulfill these requirements. In particular, polyurethane 85 Shore A as sold by Newage Industries, Inc. is suitable. As known in the art, the 85 indicates hardness and "Shore A" indicates the test procedure. The covering may be provided in any suitable fashion, e.g., a strip fastened by adhesive. A preferred embodiment is the use of an inverted U-shaped strip which snaps in place around base 21.

Round belts 17 may comprise a material similar to that of covering 22, i.e., they exhibit friction against glass. By way of example only, "Super Rounthane" 92 Shore A has been found suitable. It is this frictional engagement of the bulbs with the round belts that limits round belt conveyors of the prior art to 12 to 20 bulbs. Beyond 12 bulbs or so, the bulb-to-bulb pressure on the first becomes considerable, leading to breakage. By removing the bulbs from contact with the belts in accordance with the present invention, the bulb-to-bulb pressure is greatly reduced.

Hold-down strip 19, on the other hand, comprises a material across which the bulbs may readily slide; for example, flexible high density linear polyethylene. It is necessary that the bulbs be able to slide when in contact with hold-down strip 19 to prevent jamming. In general, the coefficient of friction between glass and the drag strip or round belts is higher than the coefficient of friction between glass and the hold-down.

In operation, consider that bulb 24 is at rest and and is resting on the neck portion of the bulb in front of it. Contact with round belt conveyor 17 is eliminated due to the lifting of bulb 24 away from belt 17. A succeeding bulb, in contact with belts 17, travels in the position indicated by dashed line 25 and, upon encountering the neck of bulb 24, climbs slightly up and away from round belt conveyor 17 to assume position 26 in which it is similarly removed from contact with belt 17.

As bulbs are removed from accumulation section 15, the mass of accumulated bulbs move forward with only momentary contact with the round belts. As can be seen from FIG. 2, successive bulbs are supported by the bulb in front of it and by drag strip 16. In this manner, the accumulation of the bulbs is made considerably more gentle and damage to the bulbs is reduced compared to accumulation systems of the prior art.

It is to be noted that an additional advantage of the present invention is that the construction of the present invention is open such that if a bulb should break it can easily fall away from drag strip 16 without pieces thereof causing a jam-up in the accumulator. Another advantage of the open construction is that, if a piece of broken glass should lodge on drag strip 16, the cullets of the succeeding bulbs merely ride up and over the obstruction, thus not impeding the normal flow of bulbs.

Figure 3:
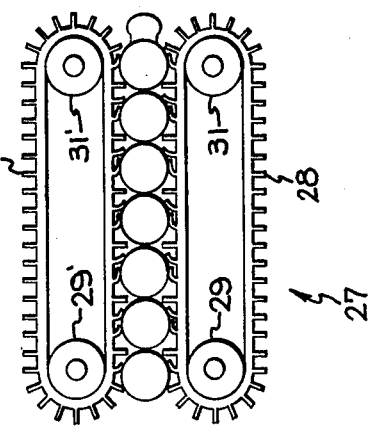
FIG. 3 is a top view of the escapement section.

From accumulation section 15, the bulbs are removed by escapement section 27 in FIG. 1 and shown in a top view in FIG. 3. The bulbs are removed, without the use of a stop gate, by means of a pair of opposing cleated belts 28, which gently grip the bulbs from opposing sides and move them forward continuously, at a slower rate than that of conveyor belt 17. Cleated belts 28 are parallel, and the portions facing each other move in the same direction and at the same speed, forming a moving defile for the bulbs. Cleated belts 28 are supported and driven by pulleys 29 and 31, one of which may comprise an idler pulley. It is essential that, to provide translation without rotation of the bulbs, one pulley for each belt is a driving pulley, driven synchronously with the other by any suitable means (not shown). This is most easily implemented, for example, by drive pulleys of equal diameter rotating at the same speed.

While the cleated belts may stop and start, depending upon the needs of the sealing machine, which is downstream therefrom, the operation of the cleated belts is continuous in that, as opposed to prior art devices, a physical impediment is not inserted in the train of bulbs to stop the procession thereof. Round belt conveyor 17 may operate continuously, and operates at a higher rate than belts 13 and 28.

As bulbs are removed from the accumulator, the remaining bulbs are momentarily lowered into contact with round belts 17 and moved forward where they again accumulate. The visual impression of the procession of bulbs is one of undulation or a waving motion. This undulation could be used as an indication for setting the proper spacing of drag strip 16 from belts 17, although it is not preferred. If drag strip 16 is too far from belts 17, the bulbs are too vertical, with the effect that the bulbs move almost simultaneously. This tends to eliminate the wave action, causing the entire accumulation of bulbs to contact the belt and then stop simultaneously, resulting in a greatly increased noise level and greater jarring of the bulbs. If drag strip 16 is too near belt 17, the bulbs are inclined too much with the result that the bulbs may drop sufficiently so that the bulbous portion strikes the cullet rather than the neck of the bulb in front, which may crack or break a percentage of the bulbs. This will also reduce the potential amount of accumulated bulbs significantly. While optimum spacing depends upon the size and shape of the bulbs, a spacing producing a bulb inclination of 45° ± 15° has been found suitable for use in the present invention.

While forming no part of the present invention, various control devices known in the art may be used in conjunction with the present invention. For example, as previously noted, the operation of output or escapement section 27 is typically controlled by the needs of the sealing machine into which output section 27 feeds the bulbs. Similarly, means for sensing the fullness of the accumulation section, for stopping flat belt conveyor 13, may also be incorporated with the present invention.

There is thus provided by the present invention an in-line bulb accumulator that is more gentle than those of the prior art since the bulbs are removed from contact with the round conveyor belts and are therefore not continuously jammed into one another. Recovery time is short since the drum-type accumulator is eliminated and the bulbs travel at a high speed over the empty portion of accumulation section 15, i.e., at the speed of the belt, and at a low speed after accumulation, as determined by the escapement. Further, a smoother escapement is provided which does not cause further impacting of the bulbs.

Having thus described the invention, it will be apparent to those of skill in the art that various modifications can be made within the spirit and scope of the present invention. For example, while described in conjunction with lamp bulbs, it is apparent that the accumulator of the present invention can also be utilized to accumulate finished lamps. Also, while illustrated in FIG. 1 as inclined from the horizontal, the accumulator of the present invention can operate over a range of approximately a 30° angle from horizontal, either uphill or downhill; i.e., it is not critical that the accumulator be inclined downhill for proper operation. Also, accumulation section 15 can be as long as desired, comprising a number of separate sections. While any suitable mechanism can be used to drive the belts, it is preferred that the round belt driving mechanism include a slip clutch and a spring-loaded take-up, known per se in the art, to accommodate variations in load or stretching of the round belts.

What we claim as new and desired to secure by Letters Patent of the United States is:

1. An in-line bulb accumulator for electric lamp bulbs comprising:
    a pair of spaced-apart conveyor belts for holding bulbs therebetween;
    a drag strip positioned below and spaced from said belts so that the cullets of said bulbs are inclined away from the direction of travel and drag on said strip when moving, said bulbs stacking when accumulating wherein each bulb is substantially supported by the preceding bulb and said strip and each accumulated bulb has minimal contact with said belts; and
    horizontal escapement means for selectively debouching bulbs from said accumulator causing less than all of the accumulated bulbs to contact said belts and move with said belts.

2. The accumulator as set forth in claim 1 wherein said accumulator further comprises:
    hold-down means positioned above and spaced a predetermined distance from said belts for limiting the distance bulbs may move away from said belts.

3. The accumulator as set forth in claim 2 wherein the coefficient of friction between glass and said drag strip is greater than the coefficient of friction between glass and said hold-down means.

4. The accumulator as set forth in claim 3 wherein said drag strip means comprises polyurethane and said hold-down means comprises polyethylene.

5. The accumulator as set forth in claim 1 wherein said escapement means comprises:
    a pair of parallel, cleated belts for holding the bulbs and providing a continuous escapement.

6. The accumulator as set forth in claim 5 wherein said escapement means translates the bulbs without rotation.

7. The accumulator as set forth in claim 6 wherein said escapement further comprises:
    two pairs of pulleys, one pair supporting each belt, wherein one pulley in each pair is driven in synchronism with the other so that the facing surfaces of said cleated belts move at the same speed.

8. The accumulator as set forth in claim 1 wherein said drag strip comprises:
    a rigid base having a plastic covering upon which bulb cullets can drag.

* * * * *